2,834,430
REMOVAL OF HYDROCARBONS FROM SULFUR DIOXIDE GASES

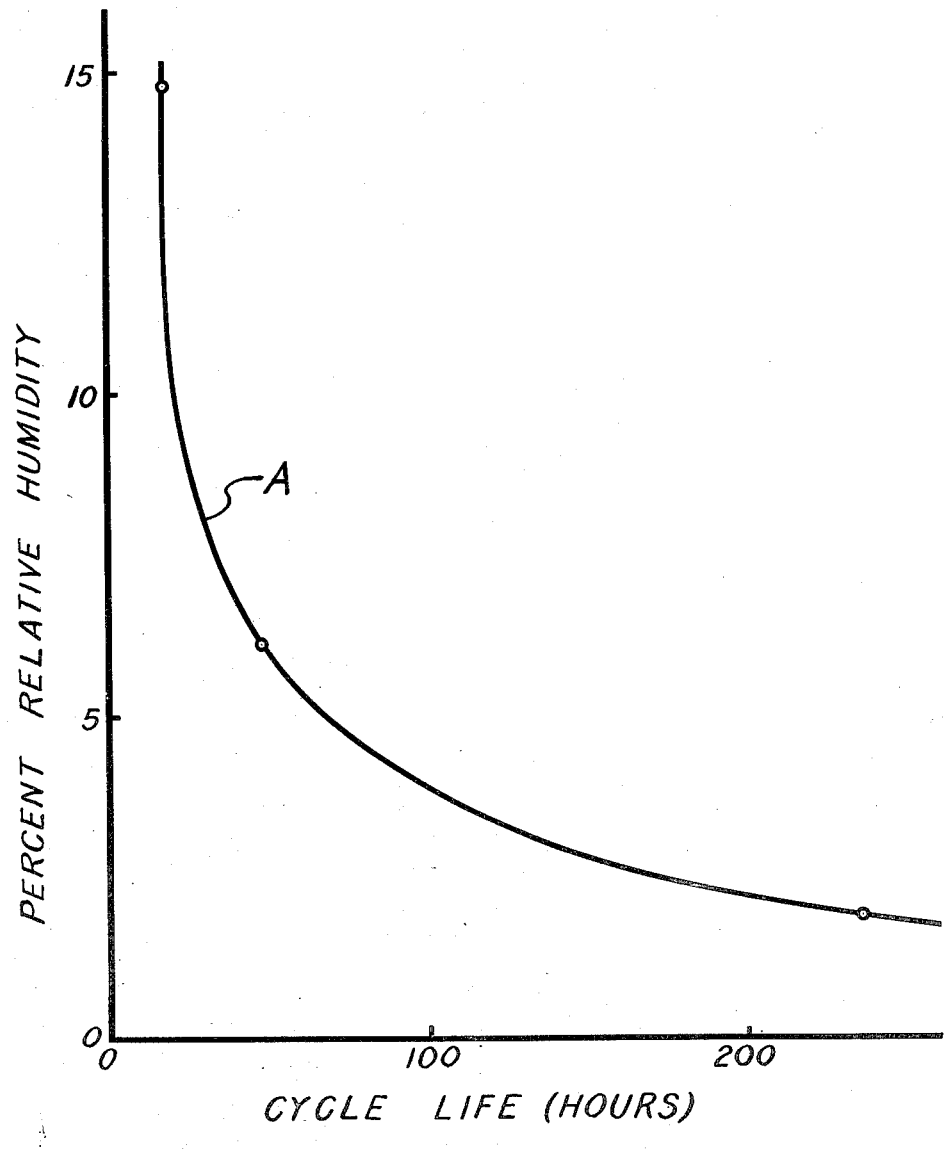

Walter F. Johnson, Westfield, N. J., assignor to American Smelting and Refining Company, New York, N. Y., a corporation of New Jersey Application March 5, 1956, Serial No. 569,495

6 Claims. (Cl. 183—114.2)

This invention relates to the removal of hydrocarbons from sulfur dioxide-containing gases. More particularly, it relates to the use of an activated carbon adsorbent for the removal of hydrocarbons contained in such gases.

Sulfur dioxide gases containing various amounts of hydrocarbons are encountered in a variety of sources. Heretofore, effective removal of hydrocarbons from such gases was not accomplished by the ordinary gas cleaning procedures which were practiced. However, unless removed from the gas or reduced in amount therein, the hydrocarbons may interfere with the subsequent processing of the gases or may cause contamination of the products obtained from such processing. Such interference or contamination may be caused by the hydrocarbons as such or may result from lower forms of the hydrocarbons or carbon which may be formed during the subsequent processing.

The difficulty caused by hydrocarbons is illustrated in the production of sulfuric acid by the contact process from $SO_2$ gases obtained by sintering or roasting of sulfidic flotation concentrates. The hydrocarbons in such gas originate from the residual organic flotation agents in the concentrate and enter the gas during the sintering or roasting operations. In producing the acid, the gases are cleaned by passing them sequentially through a first electrostatic precipitator (a so-called "hot" Cottrell) maintained at an elevated temperature, a water scrubber, a second electrostatic precipitator (a so-called "cold" or "mist" Cottrell) maintained at ordinary temperatures, and finally through a coke filter. The thus cleaned gas is then passed through a drying tower where it is dried with concentrated sulfuric acid, after which it is preheated and passed in contact with a catalyst where the sulfur dioxide is converted to sulfur trioxide accompanied by the evolution of heat. Thereafter the gas is passed through a heat exchanger in heat exchange relationship with the $SO_2$ gas passing to the catalyst, thereby preheating the latter gas and cooling the sulfur trioxide gas. The cooled gas is then passed through concentrated sulfuric acid to absorb the sulfur trioxide therefrom to form the latter into sulfuric acid.

Such gas cleaning procedure, however, is not effective for removing the hydrocarbons from the gas. As a result, the hydrocarbons are carried by the gas into the drying tower and the sulfur trioxide adsorption tower where they form acid tars which discolor the drying acid and the acid product. Also, the hydrocarbonaceous material which is carried by the gas from the drying tower into the blower and the preheater side of the heat exchanger which precede the catalyst chamber, causes corrosion to take place in this apparatus. In addition, the hydrocarbonaceous matter which is carried through the plant to the sulfur trioxide adsorption tower causes the formation of, or increases the formation of, acid mist in the sulfur trioxide cooling side of the heat exchanger, causing further corrosion in this apparatus. Such mist for the most part is not removed by the concentrated acid in the $SO_3$ adsorption tower and is carried out of the plant with the tail gases and may constitute a nuisance in that it may pollute the atmosphere. In this latter event it may become necessary to remove the mist in a second mist precipitator before discharging the tail gas from the acid plant.

The $SO_2$ content of such sinter or roaster gas is greater than the hydrocarbon content therein. Typically, such gas contains more than 2% $SO_2$ by volume, usually more than 3% and in most instances more than about 5% $SO_2$, and from 0.1 to 2.5 pounds of hydrocarbon per 100,000 cubic feet of gas measured at standard conditions of temperature and pressure. Practice of the invention to remove hydrocarbons from such gases prior to, and preferably immediately prior to, their entry into the acid drying tower readily reduces their hydrocarbon content below .06 pound and to values below .03 pound and as low as .006 pound, per 100,000 cubic feet of gas, and results in a substantial reduction or elimination of the above described difficulties. This is a principal and important objective and advantage of the invention.

Although the invention is especially useful in connection with the production of sulfuric acid from such sinter or waste gases, it may also be used advantageously to remove any hydrocarbons from any sulfur dioxide gas, especially where the presence of any hydrocarbon is undesirable or deleterious in any subsequent processing of the gas. Another advantage of the invention is that it affords a simple, low-cost process for removing hydrocarbons contained in sulfur dioxide gases. These and other advantages of the invention will become apparent from the following more detailed description thereof.

Broadly, the invention comprehends removing hydrocarbons contained in a sulfur dioxide gas by passing the gas in contact with an activated carbon adsorbent. The invention is based on the discovery that such an adsorbent selectively adsorbs hydrocarbons from sulfur dioxide-containing gases. It has also been found that the adsorbent requires periodic regeneration during its use inasmuch as its ability to remove hydrocarbons diminishes progressively until a point is reached at which hydrocarbon removal becomes undesirably low, or little or no removal takes place.

In addition, it has been found that the relative humidity of the gas contacting the adsorbent has a critically important effect upon the so-called "cycle life" of the adsorbent, i. e. the period of time that fresh or regenerated adsorbent can be used before its hydrocarbon adsorptive capacity decreases to such an extent that regeneration becomes desirable or necessary. In this respect it has been found that the relative humidity of the gas must be maintained below about 10% in order to obtain a satisfactory adsorbent cycle life. Accordingly, in a narrower aspect of the invention, the relative humidity of the hydrocarbon-containing sulfur dioxide gases passing in contact with the adsorbent is maintained below about 10%, and preferably in the range of about 1 to 6% relative humidity.

The relative humidity of the gas may be controlled by removing water therefrom, as by drying, before contacting the gas with the adsorbent—for example, the gas may be dried by contacting it with concentrated sulfuric acid. For best results, however, especially in the production of sulfuric acid by the contact process, the relative humidity is controlled without the removal of water, by heating the gas to raise its temperature. This latter procedure is used most advantageously with a wet gas having a dew point below 80° C. and by conducting the adsorption at a temperature not in excess of 150° C. to maintain relative humidity below 10%. Preferably, the dew point of the gas to be treated is within the range of 0–80° C. and the adsorption temperature is maintained within the range 36–150° C. to control the relative humidity to a value of about 1–10%. Within these ranges it is most preferred to use a gas having a dew point below 36° C., adsorption temperatures below 100° C., and to control the relative humidity to a value in a range of about 1–6%. A gas having a dew point within the preferred range may be, and preferably is, obtained by scrubbing the gas with water having a temperature in the range of 0–80° C. and preferably below 46° C. In the preferred procedure, the absolute water content of the gas contacting the adsorbent is within the range .00033 to .0183 pound of water per cubic foot of gas.

The activated carbon adsorbent is a microporous adsorbent which may be prepared by charring a hydrocarbonaceous material such as coconut shells, peach nut shells, wood, cellulose, etc. in the absence of air and then treating the charred material with steam at an elevated temperature, for example 600°–900° C. The thus prepared adsorbent may be used as such although preferably it is used in the form of pellets which advantageously may be about 1/8" to 1/4" long and about 1/8" in diameter. The pellets may be prepared by grinding the charred material, forming the ground material into pellets and then activating the latter. Preferably, the gas to be treated is passed through a fixed bed of the adsorbent although alternatively the adsorbent may be used as a moving or fluid bed, if desired. The adsorbent may be regenerated by leaching with water, preferably until the leach water is free of acid, and then dried with hot air, preferably at a temperature of about 150° C. Occasionally thereafter the adsorbent may also be treated with steam which has been superheated to 400° C. If desired, the leaching and steaming of the adsorbent may be practiced with each regeneration. Although the invention has been described in connection with an activated carbon adsorbent, it will be understood that any microporous adsorbent having a higher affinity for hydrocarbons than for water and sulfur dioxide, may be used in practicing the invention.

The invention is further illustrated in the accompanying examples and in the single figure of the drawing. It should be understood, however, that the examples and the drawing are given for purposes of illustration and that the invention in its broader aspects in not limited thereto.

In each of the examples set forth in Table I, the gas was taken from the main gas stream passing to a plant in which sulfuric acid was being produced by the contact process and in which discolored acid was obtained due to the hydrocarbons contained in the main stream. The main gas stream contained 4% to 6% $SO_2$ and sufficient oxygen for converting the sulfur dioxide to sulfur trioxide. It was produced in a known manner in a sintering plant in which a lead sulfide concentrate was sintered with air. The lead sulfide concentrate was obtained by floating lead sulfide from a lead sulfide ore, using one or more organic flotation agents, such as pine oil, cresylic acid, oleic acid, etc.

Before entering the acid plant, the main gas stream was cleaned by passing it sequentially through a first electrostatic precipitator maintained at an elevated temperature, a scrubber in which the gas was scrubbed with water at 20–22° C., a second electrostatic precipitator maintained at ordinary temperature, and then through a coke filter. The cleaned gas was then passed to the acid plant wherein it was passed in sequence through a drying tower where it was dried with concentrated sulfuric acid, a preheater, a catalyst in a catalyst chamber where the sulfur dioxide was converted to sulfur trioxide, a cooler, and then through an absorption tower in which the sulfur trioxide was absorbed in concentrated sulfuric acid to form additional acid.

In each of the examples, a stream of gas, bled from the main gas stream at a point between the coke filter and the acid drying tower, was passed through a heating tube in which the relative humidity of the gas was adjusted to the value indicated in Table I by heating the gas to the temperature set forth under the heading "dry bulb temperature" in the table. The heated gas was then passed through a fixed bed absorbent consisting of activated carbon in the form of pellets about 1/8" in diameter and about 1/8" to 1/4" in length. The adsorbent was contained in a 2.25" diameter tube, the depth of the adsorbent bed in the tube was 12 inches, the flow of gas through the adsorbent tube was at the rate of 1.25 cubic feet per minute corresponding to a space velocity of 45 feet per minute, the contact time between the gas and the adsorbent in the tube gas was less than 1.5 seconds, and the initial weight of the adsorbent was approximately 345 grams. The hydrocarbon content of the gas before and after contact with the adsorbent was determined and the period of time during which the adsorbent removed more than 90% of the hydrocarbons was noted and is set forth under the heading "cycle life" in Table I.

For convenience, the hydrocarbon content of the gas was determined by passing a stream of the gas at a rate of 0.6 cubic feet per minute and for a period of 25 minutes through 98% sulfuric acid which was at a temperature of 20° C. At the end of the 25 minute period, the acid was heated to 75° C. and maintained at this temperature for 2.5 hours. A sample of the acid was then placed in a photoelectric colorimeter and its light transmitting capacity was determined. The colorimeter reading of the acid sample was compared with that of a water-clear, chemically pure sulfuric acid and from these readings the relative hydrocarbon content of the gas was calculated. In each of the examples, the gas passing to the adsorbent produced a dark color in the 98% test acid and this color darkened further during the 2.5 hours' heating period. However, in each of the examples, the gas from the adsorbent produced subtantially no discoloration of the test acid to the naked eye.

*Table I*

| Example | Relative Humidity | Dry Bulb Temp., ° C. | Cycle Life, Hours |
|---|---|---|---|
| 1 | 14.8 | 54 | 18 |
| 2 | 6.1 | 75 | 48 |
| 3 | 1.9 | 102 | 236 |

The results set forth in Table I are illustrated graphically in the accompanying drawing, the single figure of which shows a curve "A" obtained by plotting cycle life of the adsorbent in hour as the abscissa and the percent relative humidity of the gas as the ordinate.

It will be noted that the relative humidity of the gas has a critical effect upon the cycle life of the adsorbent. With relative humidities above about 10%, the cycle life remains extremely short. At a value of about 10%, the cycle life begins to increase at a moderate rate until a relative humidity value of about 6% is reached. Thereafter, as the relative humidity of the gas is further decreased, the cycle life of the adsorbent increases at a rapid rate.

At the end of the run in each of the examples set forth in Table I, the adsorbent was regenerated by washing with hot water. It was found that the wash water contained sulfuric acid which had formed during the adsorption step. The washing, therefore, was continued until the water contained less than 0.25% $H_2SO_4$. Thereafter, the adsorbent was drained and hot air at 150° C. was passed through the wet adsorbent until the adsorbent was dry. Upon re-use, it was found that the hydrocarbon adsorptivity of the adsorbent was restored.

The reason for the loss in adsorptivity of adsorbent during use is not understood. It may be due to the amount of sulfuric acid formed in the adsorbent during the adsorption or to the accumulation of hydrocarbons therein or to both of these factors. In any event, it has been found that more acid can be tolerated in the activated carbon adsorbent and the adsorbent will still remove more hydrocarbon when the gas to be contacted with the adsorbent has a relative humidity below about 10%, than when the relative humidity of the gas is above 10%.

The effect of the amount of acid in relation to the relative humidity of the gas is shown by the following test. A stream of gas from a sinter plant was passed over an activated adsorbent as described in connection with the examples set forth in Table I. The temperature of the gas passing to the adsorbent was 53° C. and at this temperature the gas possessed a relative humidity of 13.5%. At the end of 17 hours, the adsorbent contained 25.2% acid by weight and was removing only 76% of the hydrocarbons contained in the gas. After regenerating the adsorbent, the gas was passed therethrough at 83° C., at which temperature the gas possessed a relative humidity of 3.5%. At the end of 41 hours, the adsorbent contained 34.7% acid by weight; however, it was still removing 92% of the hydrocarbons contained in the gas.

What is claimed is:

1. In a process for removing organic constituents which discolorize concentrated sulfuric acid from an $SO_2$ gas involving contacting a stream of said gas with an activated carbon adsorbent to remove said discolorizing organic constituents from the gas, the improvement which comprises establishing in said gas stream a relative humidity below about 10% and passing the thus established stream in contact with the activated carbon adsorbent, whereby the adsorptive capacity of said adsorbent is enhanced.

2. In a process for removing organic constituents which discolorize concentrated sulfuric acid from an $SO_2$ gas obtained from a sulfidic material containing organic matter, said gas being a wet gas having a dew point below 80° C., said process involving contacting a stream of said gas with an activated carbon adsorbent to remove said disclorizing organic constituents from the gas, the improvement which comprises establishing in said gas stream a relative humidity in the range of about 1 to 10% and a temperature below 150° C., and passing the thus established stream through the activated carbon adsorbent, whereby the adsorptive capacity of said adsorbent is enhanced.

3. In a process for removing organic constituents which discolorize concentrated sulfuric acid from an $SO_2$ gas obtained from a sulfidic material containing organic matter involving contacting a stream of said gas with an activated carbon adsorbent to remove said discolorizing constituents from the gas, the improvement which comprises scrubbing said stream of gas with water having a temperature in the range 0° to 80° C., heating the scrubbed gas to a temperature in the range 36° to 150° C. thereby establishing a gas stream having a relative humidity value in the range of about 1% to 10%, and passing the thus established stream through the activated carbon adsorbent, whereby the adsorptive capacity of said adsorbent is enhanced.

4. In a process for removing organic constituents which discolorize concentrated sulfuric acid from an $SO_2$ gas obtained by sintering a sulfide ore concentrate containing a residual organic flotation agent, said process involving contacting a stream of said gas with an activated carbon adsorbent to remove said discolorizing organic constituents from the gas and regenerating the adsorbent when its adsorptive capacity has been reduced to an undesirably low capacity, the improvement which comprises scrubbing said stream of gas with water having a temperature not in excess of 36° C., heating the scrubbed gas to a sufficient temperature below 100° C. to establish in the gas a relative humidity in the range of about 1 to 6%, whereby the adsorptive period before regeneration of the adsorbent is prolonged.

5. A process according to claim 4 in which said adsorbent is regenerated after a desired period of use by washing the adsorbent with water until the wash water is substantially free of acid and the washed adsorbent is dried with air.

6. A process according to claim 5 in which said adsorbent is washed with hot water and is dried with air heated to about 150° C.

References Cited in the file of this patent

UNITED STATES PATENTS

| | | |
|---|---|---|
| 1,939,694 | Hasche | Dec. 19, 1933 |
| 2,519,874 | Berg | Aug. 22, 1950 |

OTHER REFERENCES

"Adsorption," by C. L. Mantell, McGraw-Hill Book Co., Inc., New York, first edition, 1945, page 12.